Jan. 26, 1932.   H. C. L. DUNKER   1,842,719
DEVICE FOR OBTAINING A SHARP CUTTING OF THE RUBBER GOLOSHING
OF CLOTH SHOES OR THE LIKE FOOTWEAR PROVIDED BY PRESSING
WITH WHOLLY OR PARTLY RUBBER COVERED SIDES
Filed April 22, 1930
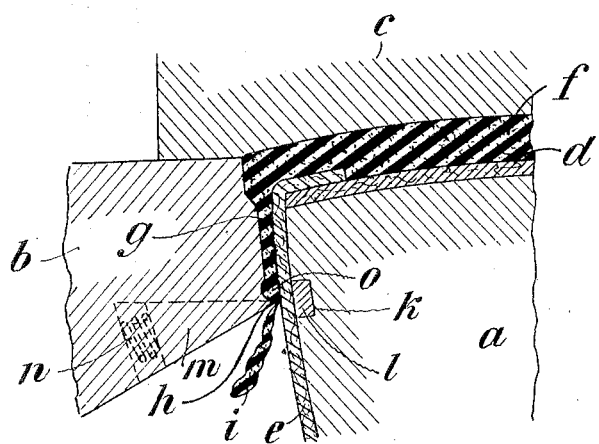
H. C. L. Dunker
INVENTOR
By: Marks & Clerk
Attys.

Patented Jan. 26, 1932

1,842,719

UNITED STATES PATENT OFFICE

HENRY CHRISTIAN LOUIS DUNKER, OF HELSINGBORG, SWEDEN

DEVICE FOR OBTAINING A SHARP CUTTING OF THE RUBBER GOLOSHING OF CLOTH SHOES OR THE LIKE FOOTWEAR PROVIDED BY PRESSING WITH WHOLLY OR PARTLY RUBBER-COVERED SIDES

Application filed April 22, 1930, Serial No. 446,421, and in Germany March 17, 1930.

This invention relates to improvements in the manufacture of boots, shoes and like footwear with rubber soles and wholly or partly rubber covered sides.

The invention has for its object to provide an arrangement for producing a clean and sharp cut of the rubber covering of the shoe along the body part of the latter without the slightest possibility of cutting, mutilating or otherwise injuring the fabric, leather or other material of the article of footwear.

A further object of the invention is the provision of a novel form of mold and last in which the portions which effect the cutting of the rubber material possess such qualities of resilience as will allow them to yield sufficiently to avoid injury to the other portion of the article of footwear.

A further object of the invention is to so construct the cutting portions of the mold and last as to increase the cutting efficiency thereof and at the same time to produce a reinforcement extending along the cut edge of the rubber material.

In the accompanying drawing wherein an approved embodiment of the invention is illustrated, the figure is a fragmentary sectional view through portions of a last and the coacting sole and side molds, a portion of a partially completed rubber sole shoe being shown in position therein.

Referring to the drawing in detail, the letter $a$ indicates the last which is arranged in cooperation with the relatively movable side and sole molds $b$ and $c$, respectively.

Prior to inserting the last $a$ in the press and fixing it to the press table, it is covered with the insole $d$ and the desired material $e$ which latter is to constitute the shoe upper. The rubber material $f$ designed to form the sole of the finished shoe is laid upon the insole $d$ together with a second rubber piece $g$ which latter extends upwardly along the upper $e$ for a distance corresponding to the extent to which it is desired to cover the shoe upper with rubber.

According to the invention, the major portion of the side mold $b$ extends in substantially parallel relation to the contiguous surface of the last $a$ to form a space for the accommodation of the rubber material $g$. The side mold $b$ terminates in a cutting edge $h$ and a recess or channel $o$ substantially semicircular in cross section is formed in the mold $b$ which extends along the cutting edge $h$ and disposes the latter in a position substantially perpendicular to the adjacent surface of the last $a$. By forming the channel or undercut $o$ the cutting edge $h$ is sharpened and rendered highly effective in use, while the channel $o$ acts to mold a longitudinal rib along the cut edge of the rubber material thereby effectively reinforcing the latter.

To obtain the desired resiliency or yieldableness between the last $a$ and side mold cutting edge $h$ either one or the other or both of the last mentioned parts may be yieldably mounted or constituted by yieldable or resilient material. Thus, when the mold parts are moved toward the last in the act of molding the rubber material the latter is cut along the edge $h$, but danger of cutting or otherwise mutilating the fabric $e$ due to unavoidable unequalities in the thickness of the latter or to the application of excessive pressure is entirely obviated.

According to the invention, one way of obtaining the yieldable cutting effect is to form a recess $k$ in the region of the last $a$ adjacent the cutting edge $h$ and inserting a strip of rubber, leather, felt, lead or other yieldable material therein. When the side molds $b$ have reached their inner positions, the cutting edge $h$ bears against that portion of the upper $e$ which overlies the strip $k$, and due to the yieldable quality of the latter possibility of injuring the fabric or other material is obviated.

As an alternative arrangement, the cutting edge $h$ may be formed as a separate part $m$ from the mold $b$ and fitted into the latter, a spring $n$ being interposed between the cutting member $m$ and the mold $b$ whereby the cutting edge is resiliently maintained in predetermined position but may yield in accordance with irregularities in the thickness of the material $e$ during correct positioning of the side molds.

The yieldable strip $k$ or the yieldably mounted cutting member $m$ may be used alternatively for providing the desired yieldable cutting effect or these two species may be used together.

In a further modification of the invention the yieldable strip $k$ may be replaced by a sheet of yieldable material wholly covering the side of the last $a$.

In addition to disposing the cutting edge $h$ in the most effective position for producing a clean even cut of the rubber material $g$, the channel $o$ produces on the finished article a molded rib constituting a reinforcement and edge stiffener.

What I claim is:

1. In combination, a last member, a mold member, a cutting edge carried by the mold member, and yieldable means to cushion the cutting action of the cutting edge on the material overlying the last.

2. In combination, a last member, a mold member, a cutting edge carried by the mold member, and yieldable means carried by one of said members to resiliently cushion the cutting action of the cutting edge on the shoe material overlying the last member.

3. In combination, a last member, a plurality of mold members movable relatively to the last member, cutting edges on the side mold members, and yieldable means for cushioning the cutting action of the cutting member on the shoe material overlying the last.

4. In combination, a last member, a side mold member, a cutting edge on the side mold member adapted to coact with shoe material overlying the last member, and resilient means in the portion of the surface of the last member underlying the cutting edge.

5. In combination, a last member, a side mold member, a cutting edge carried by the side mold member to coact with shoe material overlying the last member, and a strip of resilient material in the portion of the last member underlying the cutting edge.

6. In combination, a last member, a side mold member, a cutting edge carried by the side mold member, said last member having a recess therein, and a resilient member disposed in said recess and subjected to the pressure exerted by the cutting edge.

7. In combination, a last member, a side mold member, a cutting edge carried by the side mold member, and a cover of resilient material applied externally to the last member.

8. In combination, a last member, a side mold member, and a resiliently mounted cutting edge movable with the side mold member toward the material overlying the last member.

9. In combination, a last member, a side mold member, and a cutting edge on the side mold member, the portion of the mold member adjacent said cutting edge being recessed to dispose the cutting edge in substantially perpendicular relation to the plane of the adjacent surface of the last member.

10. In combination, a last member, a side mold member, and a cutting edge on the side mold member, the portion of the mold member adjacent said cutting edge being recessed to dispose the cutting edge in substantially perpendicular relation to the plane of the adjacent surface of the last member, said recess being located in the molding surface of the mold member to form a reinforcing rib on the molded portion of the shoe.

11. In combination, a last member, a side mold member, a cutting edge carried by the side mold member, and yieldable means to cushion the cutting action of the cutting edge on the material overlying the last, the portion of the mold member lying adjacent the cutting edge being recessed.

12. In combination, a last member, a side mold member, a cutting edge carried by the mold member, and yieldable means to cushion the cutting action of the cutting edge on the material overlying the last, the portion of the molding surface of the molding member adjacent said cutting edge being recessed.

In testimony whereof I affix my signature.

HENRY CHRISTIAN LOUIS DUNKER.